United States Patent [19]

Badaoui et al.

[11] Patent Number: 5,119,376
[45] Date of Patent: Jun. 2, 1992

[54] INTERCONNECTION SYSTEM FOR THE ATTACHMENT OF USER EQUIPMENTS TO A COMMUNICATION PROCESSING UNIT

[75] Inventors: Mohamed Badaoui, Nice; Jean Calvignac, La Gaude; Guy Carle, Sain-Jeannet; Christian Garcia; Pierre Vachee, both of La Gaude, all of France

[73] Assignee: International Business Machines Corporation, Armonk, N.Y.

[21] Appl. No.: 506,035

[22] Filed: Apr. 6, 1990

[30] Foreign Application Priority Data

Apr. 25, 1989 [EP] European Pat. Off. ........ 89480060.6

[51] Int. Cl.[5] ............................ H04J 3/12; H04J 3/24
[52] U.S. Cl. .................................. 370/110.1; 370/79; 370/85.1; 370/85.7; 370/94.1
[58] Field of Search ...................... 370/94.1, 79, 85.1, 370/60, 60.1, 85.7, 91, 95.1, 99, 110.1, 112

[56] References Cited

U.S. PATENT DOCUMENTS

| | | | |
|---|---|---|---|
| 4,079,452 | 3/1978 | Larson et al. | 364/200 |
| 4,547,880 | 10/1985 | De Vita et al. | 370/85.1 |
| 4,760,573 | 7/1988 | Calvignac et al. | 370/55 |
| 4,763,321 | 8/1988 | Calvignac et al. | 370/85.1 |
| 4,811,339 | 3/1989 | Bouillot et al. | 370/79 |
| 4,819,230 | 4/1989 | Calvignac et al. | 370/94.1 |

FOREIGN PATENT DOCUMENTS 0048781 4/1982 European Pat. Off. .
0077863 5/1983 European Pat. Off. .
0138717 6/1985 European Pat. Off. .

OTHER PUBLICATIONS

EDN Magazine vol. 26, No. 3, Feb. 1981, p. 88, "MC Design Techniques".

Primary Examiner—Douglas W. Olms
Assistant Examiner—Alpus H. Hsu
Attorney, Agent, or Firm—Joscelyn G. Cockburn

[57] ABSTRACT

Interconnection system for attaching a maximum number n of equipment users EU (DCE or DTE) to the line adapter (2) of a communication processing unit. The user data and control bits are carried on transmit and receive serial link 4 and 6 in data and control slot entities arranged in frame of period T, comprising one entity per user. These entities are allocated to the user equipments through multiplexing/demultiplexing circuit (10), link adapters (12-1) to (12-8) and connecting boxes (30-1) to (30-8). The user equipments are connected through active remote modules which are specific to the standardized interfaces of the user equipments. Link adapters (12-1) to (12-8) add to the data and control slot entities an outband slot which is used for exchanging control information, such as the active remote module address and type which are stored in memory (42), to be transmitted to the line adapter (2). The advantage of the interconnection system is that the attachment of the user equipments is simplified.

16 Claims, 9 Drawing Sheets

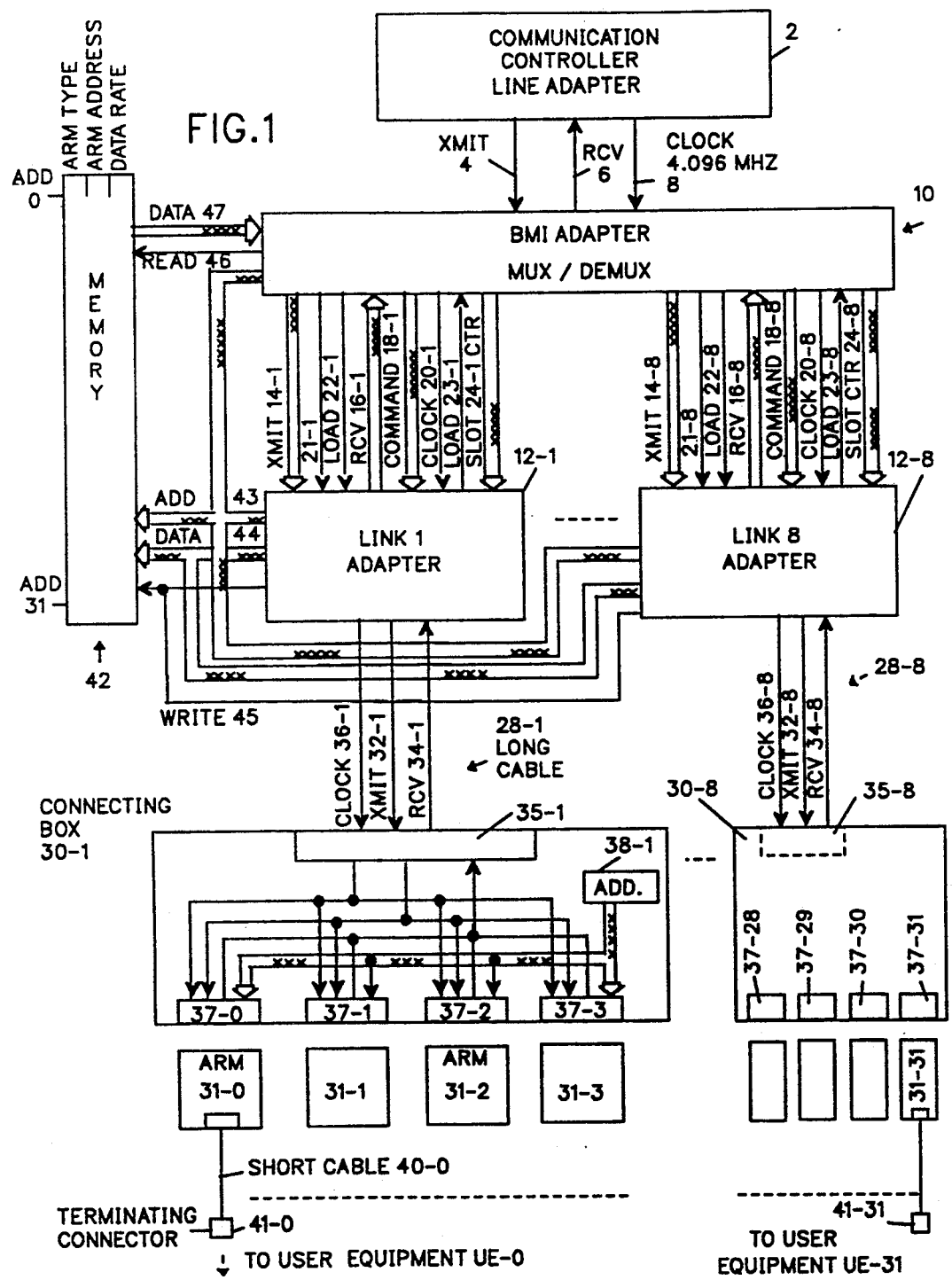

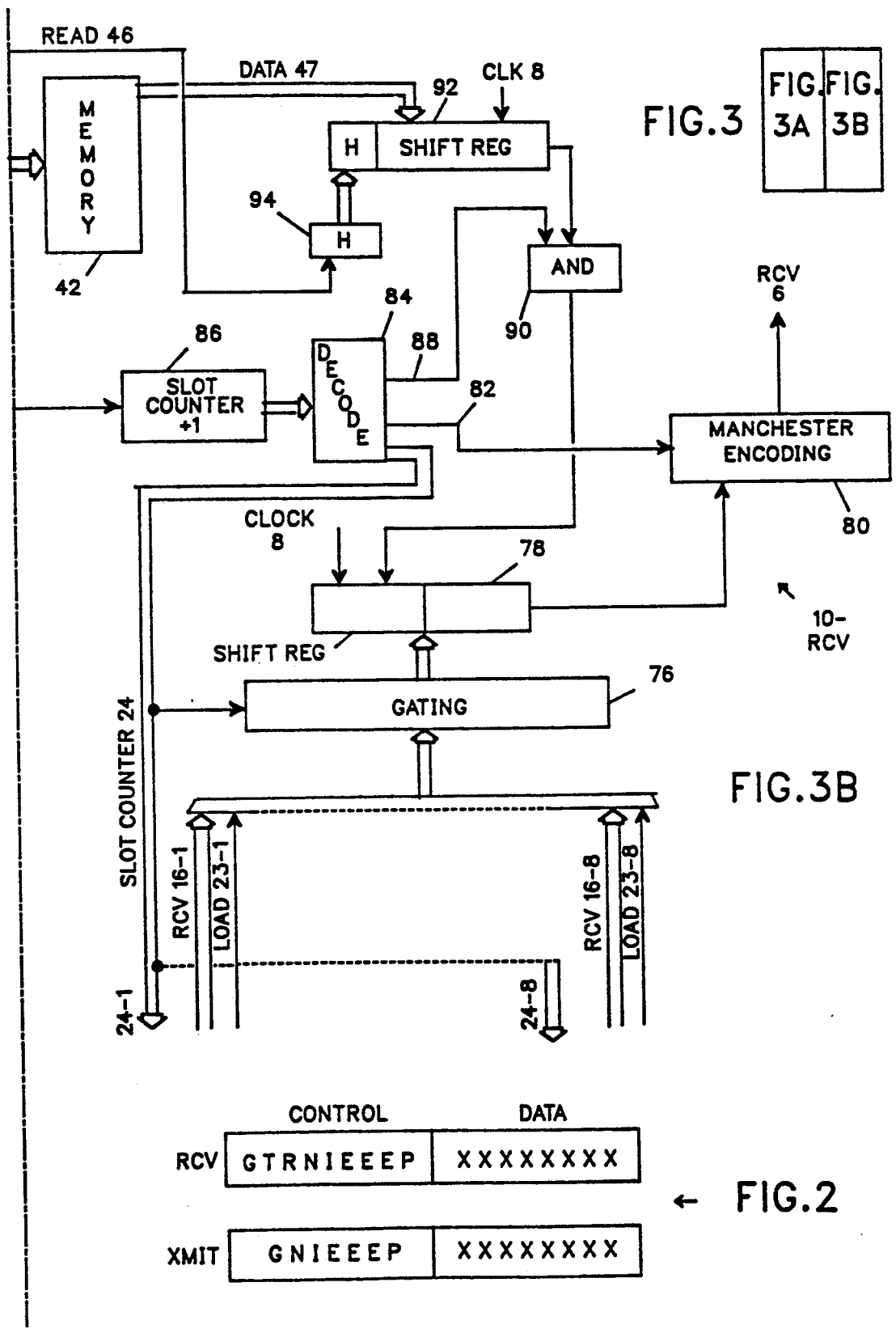

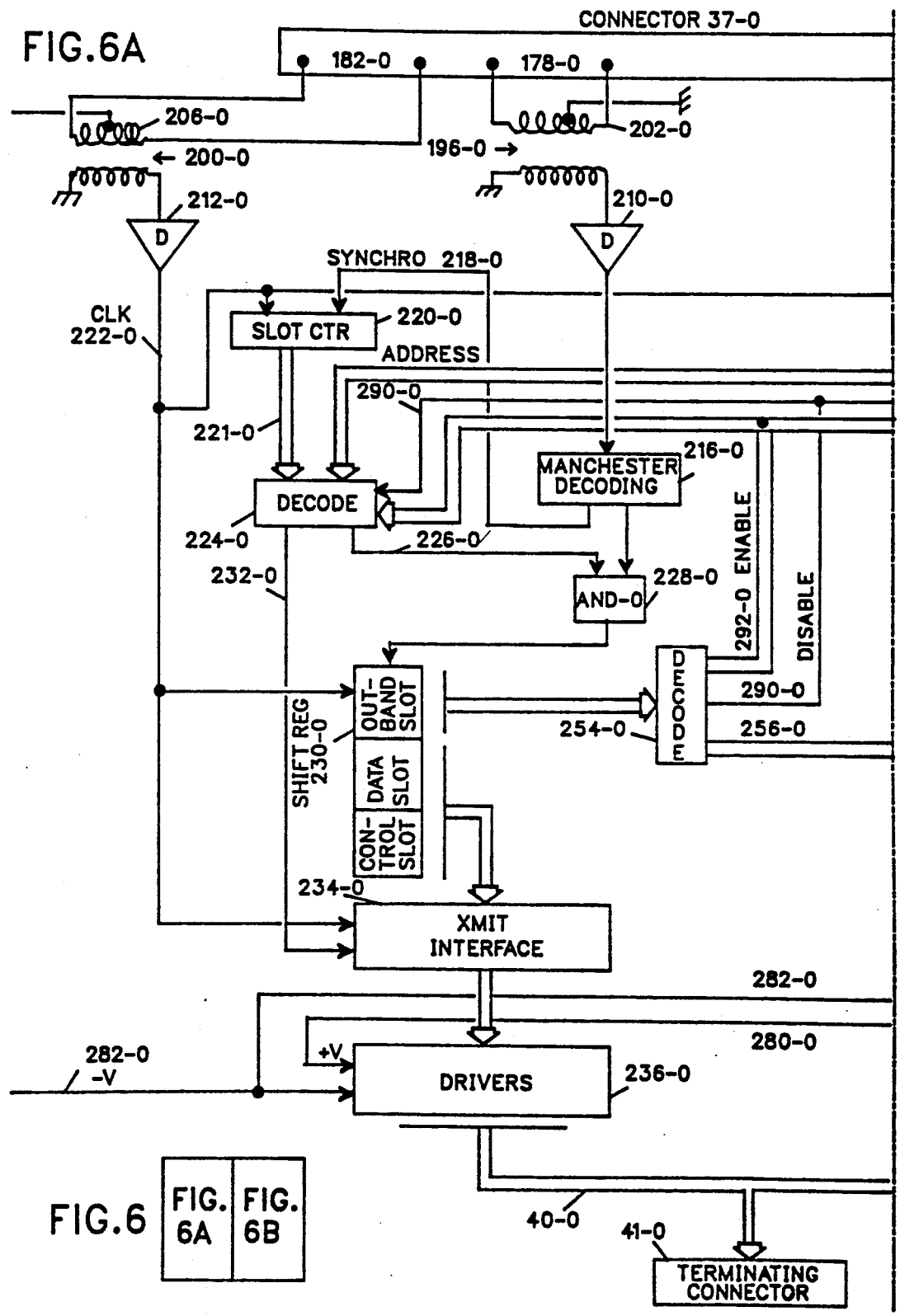

FIG.8

INTERCONNECTION SYSTEM FOR THE ATTACHMENT OF USER EQUIPMENTS TO A COMMUNICATION PROCESSING UNIT

DESCRIPTION OF THE INVENTION

1. Field of the Invention

This invention relates to an interconnection system for connecting user equipments, such as data circuit terminating equipments DCE or data terminal equipments DTE, to a processing unit. The subject interconnection system improves the plugging of the user equipments and allows any type of equipments to be connected to any input port of line adapters of a communication processing unit and gives the line adapter the capability of automatically adapting its operation to the configuration and types of connected equipments.

2. Background Art

There exists a high number of standardized interfaces such as RS 232, V24, V35, X21, etc which characterize the type of users equipments DCE or DTE which may be connected to a communication processing unit such as a communication controller through line adapters. Consequently, different line interface circuits have to be provided to accommodate the different physical characteristics of the standardized interfaces. As a result, whenever the connected equipments have to be replaced by equipments having different interfaces, the line interface circuits have to be changed and the communication controller have to be reconfigured to take the changes into account.

U.S. Pat. No. 4,760,573 describes a basic multiplex interface for interconnecting the line scanning means of a communication controller to user lines via serial transmit and receive multiplex links. The data and control bits are exchanged in synchronous frames wherein two slots are assigned to each user line one for data and one for control bits, the format of the data and control slots being identical for all kinds of users. In addition to the specific circuits which are provided in the line interface circuits to process the received bits and the bits to be transmitted according to the control and data slot format, specific line terminating circuits have to be provided to accommodate the different types of user equipments which may be connected to the line interface circuits, as described above.

In the data processing environment, systems are known which allow a microprocessor or central unit to determine which boards or cards are connected and which positions they occupy. Such systems are described in the article entitled "Interrogation Tells Microprocessor which Boards are Present" published in EDN Magazine, Volume 26, No 3, February 1981 page 88, and in European Patent Applications 0 087 367 and 0 0 87 368.

This type of systems can not be used in the telecommunication environment, when the number of equipment users to be connected to a communication controller is high, because they need too many wires and connection pins.

OBJECTS OF THE INVENTION

An object of the present invention is to provide an interconnection system which allows any type of user equipment DCE or DTE to be connected at any input port of a communication controller through a simple connection module.

SUMMARY OF THE INVENTION

The interconnection system according to the present invention allows a maximum number n of equipment users (EU) to be attached through their standardized interface leads to each line adapter of a communication processing unit. The line adapter has a transmit serial link and a receive serial link on which the data and control information are carried in data and control slot entities with at least one entity for each user equipment which may be attached to the line adapter. The n entities form frames which are carried on the transmit and receive links in periods T, each control slot comprising at least one internal control bit I for carrying control information for the internal operation of the communication processing unit and at least one external control bit E for carrying control information from or to the user equipment. The interconnection system is characterized in that it comprises:

dispatching means connected to the transmit and receive serial links and having p pairs of output and input serial links, with $n/p = q$ being an integer, said dispatching means comprising:

first transmitting means which receives the data and control slot entities from the transmit serial link and assemble p distinct sets of q data and control slot entities therefrom and add an outband slot to each data and control slot entity, and provides each one of the p sets of q data, control and outband slots on one output serial link among the p output serial links, in a frame period T, first receiving means for building the frames to be sent on the receive serial link from the bits received on the input serial link, p remote connecting means, each one comprising a long distance transmission means and a connecting box provided with q identical connecting interfaces, the q connecting interfaces of a connecting box being connected to one pair of output and input serial links among the p pairs, through the long distance transmission means, active remote attachment means which are specific to the user equipment standardized interfaces, each user equipment being attached to the line adapter through an active remote attachement means connected to a connecting interface, each active remote attachment means adapting the standardized interface of the connected user equipment to the connecting interface, said active remote attachment means comprising:

second transmitting means connected to the output serial link and second receiving means for providing the user equipment data and control bits arranged in data and control slots on the input serial link of the first receiving means, the second transmitting means selecting in each q sets of data, control and outband slots, the set which is assigned to the connected user equipment and being responsive to commands sent by the line adapter by means of the internal bits, which are received through the outband slot for generating the responses to the commands which are returned to the line adapting means through the second receiving means in an outband slot added to the data and control slots from the connected equipment user.

According to a feature of the present invention the active remote attachment means comprises address storing means and parameter storing means for storing the type of standardized interface which may be attached to the active remote attchment means. Each connecting box comprises address generating means which provide a specific address to each connecting interface, so that when a user equipment is connected through the active remote attachment means to the connecting interface, the connecting interface address is stored into the address register of the active remote attachement means. The active remote attachment means are responsive to an identification command requesting the identification of the active remote attachment means and received from the line adapter in the outband slot for causing the content of the address and parameter storing means to be returned by the second receiving means in the outband slot.

BRIEF DESCRIPTION OF THE FIGURES

FIG. 1 represents the block diagram of the system of the present invention.

FIG. 2 represents the format of the data and control slots.

FIG. 3 which includes FIGS. 3A and 3B represents a detailed implementation of the multiplexing demultiplexing circuit 10 of FIG. 1.

FIG. 6 which includes FIGS. 6A and 6B represents a detailed implementation of an active remote module 31 of FIG. 1.

FIG. 8 represents the logic circuit in the receive interface of an active remote module, which is specific to the V24 interface.

DETAILED DESCRIPTION OF THE INVENTION

Figure 3A:
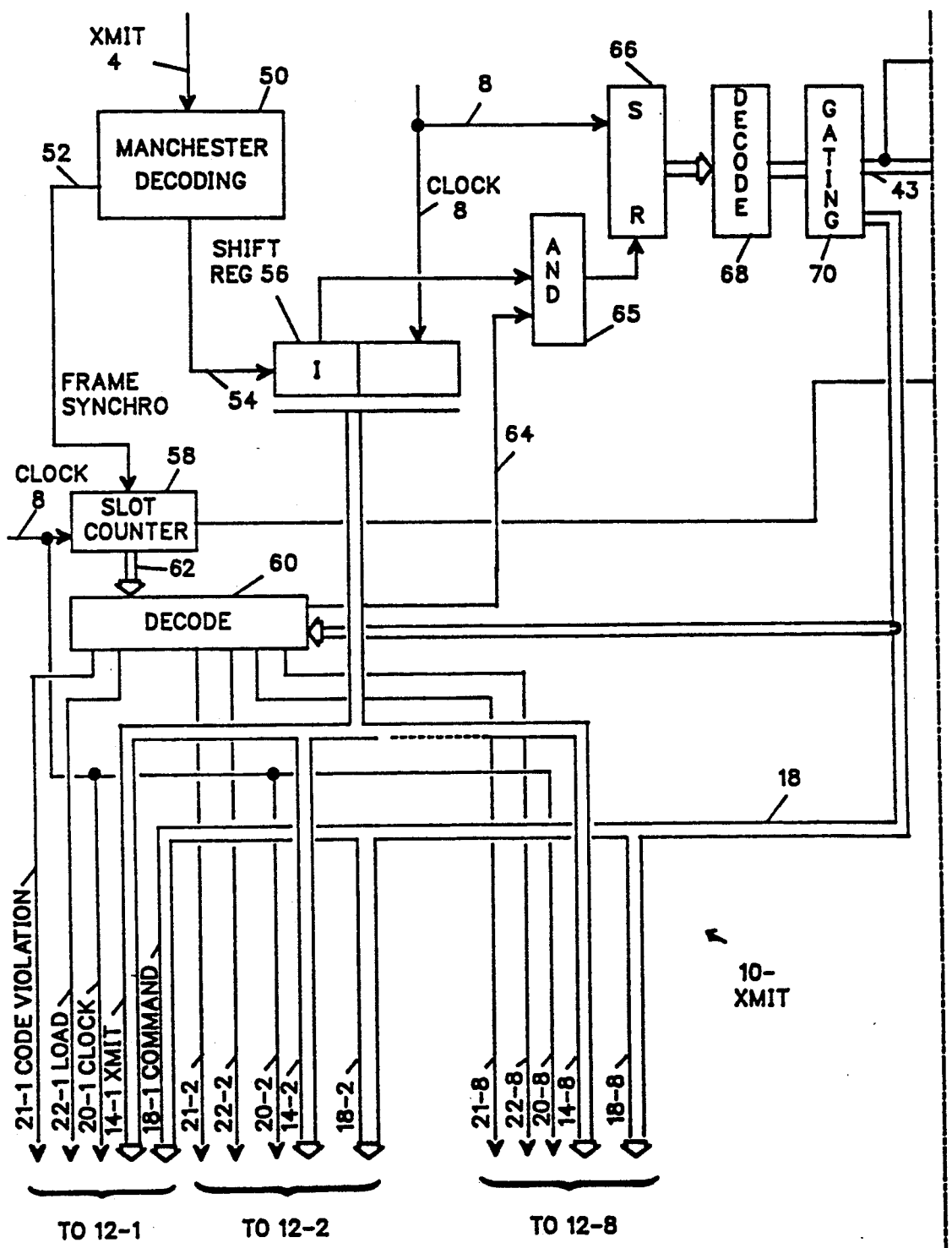

As shown in FIG. 1, the line adapter 2 of the communication controller which incorporates the subject invention provides the data bits and control bits which have to be sent to the user equipments UE (not shown) in data slots and control slots respectively, on the transmit link XMIT 4. The data bits and control bits received from the user equipments UE are received by the adapter 2 though the receive link RCV 6. These bits are also arranged in data slots and control slots. In a preferred embodiment of the invention, the data and control slots have a format similar to the format described in above referenced patent. The function of the line adapter 2 is to scan the user lines and as it is well known, a communication controller such as an IBM 3745 Communication Controller comprises a plurality of line adapters.

It is assumed that the line adapter 2 may be attached to a maximum number n of equipment users UE, said number being equal to 32 in a preferred embodiment of the invention. The data and control slots assigned to the equipment users are arranged in frames with at least one data slot and one control slot for each equipment user.

Assuming that the frame duration is equal to 125 microseconds, the bit clock signal which is sent on line 8 to time the transmission and reception operations has a frequency equal to 4.096 Megaherz. Assuming that the 32 equipment users are present, the adapter 2 builds frames comprising one data slot and one control slot assigned to each user equipment, which may be working at a maximum data rate of 64 kilobit per second. To accommodate user equipments having higher data rates, a plurality of slots in the frames are assigned to high speed users. In that case the number of equipment users which may be scanned by the line adapter is decreased.

In that environment, the connection system according to the present invention, comprises a multiplexing-/demultiplexing circuit MUX/DEMUX 10 which receives the frames from XMIT link 4 and the clock signal from line 8, deserializes the data and control bits taken from the successive data and control slots and gates the deserialized data and control bits in parallel to selected link adapters 12-1 to 12-8 through selected busses 14-1 to 14-8. Circuit 10 also receives the parallel data and control slots from busses 16-1 to 16-8, serializes them into frames to be sent on link RCV 6.

The number of link adapters 12 is a submultiple p of n.

In a preferred embodiment of the invention, there are p=8 line adapters 12-1 to 12-8, each one processing the q=n/p=4 data and control slots assigned to selected user equipments. For example, data and control slots 0, 8, 16 and 24 are processed by link adapter 12-1, data and control slots 1, 9, 17 and 25 are processed by link adapter 12-2, etc. . Finally, data and control slots 7, 15, 23 and 31 are processed by link adapter 12-8.

Multiplexing and demultiplexing circuit 10 is also able to send commands on busses 18-1 to 18-8, bit clock signals on lines 20-1 to 20-8 and slot number indications on busses 24-1 to 14-8. It also sends CODE VIOLATION commands on lines 21-1 to 21-8 and LOAD commands on lines 22-1 to 22-8 to the line adapters 12-1 to 12-8. It receives LOAD commands from line adapters 12-1 to 12-8 on lines 23-1 to 23-8, as will be described later on in reference to the detailed descriptions of the circuit 10 and link adapters 12-1 to 12-8.

Each link adapter 12-1 to 12-8 is connected through a long cable 28-1 to 28-8 to a distant connecting box 30-1 to 30-8. The length of the cables may be chosen to fulfill the requirement of the application of the invention, it may vary from 110 meters to several kilometers. The cables 28-1 to 28-8 may be simple twisted pair cables or optical fibers.

Each cable 28 only comprises three wire pairs: namely a transmit pair 32, a receive pair 34 and a clock pair 36.

The transmit and receive pairs 32-1 to 32-8 and 34-1 to 34-8 carry the data and control bits assigned to four equipment users, if any, which may be connected to the connecting boxes 30-1 to 30-8 through active remote modules ARM 31-0 to 31-31.

Cables 28-1 to 28-8 are connected to the connecting boxes 30-1 to 30-8 through input connectors 35-1 to 35-8 and the active remote modules 31-0 to 31-31 may be connected to the connecting boxes through output connectors 37-0 to 37-31.

Figure 5:
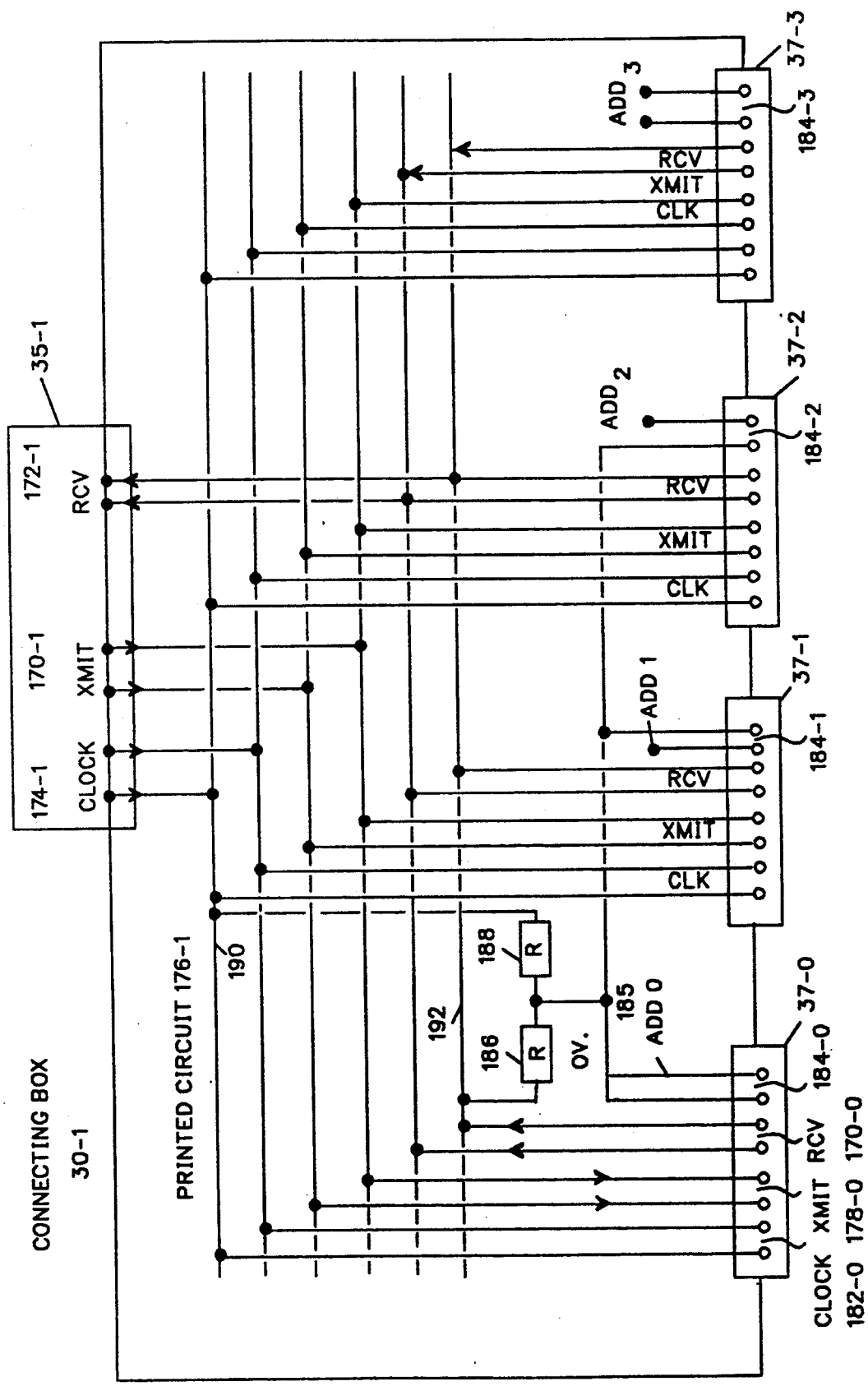
FIG. 5 represents a detailed implementation of a connecting box 30 of FIG. 1.

Each connecting box comprises connecting means which will be described in more details in reference to FIG. 5 and means 38 for generating the address of each active remote module which may be connected through connectors 37-0 to 37-31.

The active remote modules will be described in details in reference to FIG. 5. Only the short connection cable 40-0 and the terminating connector 41-0 which allow a user equipment to be connected to the adapter 2 are shown. Obviously, each active remote module is provided with such a short cable and connector assembly.

The active remote modules 31 and terminating connectors 41 are the only components which are specific to the user equipments to be connected.

Thanks to the arrangement of the link adapters and connecting boxes, the communication controller configuration may be changed by plugging the required active remote modules which correspond to the types of user equipments to be attached to the communication controller, and the line adapter will recognize the equipment user configuration, as will be described later on.

This is done under control of the line adapter 2 which has the capability of sending commands through busses 18-1 to 8-8 to initiate a process by which the ARM type/address/data rate parameters of the plugged ARM modules are recorded in memory 42.

Memory 42 has n positions, i.e 32 in the specific implementation of the present invention, at addresses 0 to 31. Each position is assigned to each one of the output connectors 37-0 to 37-31 for storing the ARM parameters of the modules if any, which are plugged into the corresponding connectors 37-0 to 37-31.

The memory addresses may be generated on address bus 43 by link adapters 12-1 to 12-8 or by multiplexing-/demultiplexing circuit 10. The write command on line 45, as well as the data on bus 44 to be written, into the addressed position are generated by link adapters 12-1 to 12-8.

The memory read commands are generated by the line adapter and decoded, by multiplexing/demultiplexing circuit 10 which activates read 46 and the read data are provided to circuit 10 through bus 47 to be sent to line adapter 2.

As described in details in U.S. Pat. No. 4,760,573, the data and control slots entities have a preferred format. FIG. 2 represents this preferred format.

As shown in FIG. 2, the data slots comprise data bits. Since the user equipment may work at data rate lower than 64 kilobits per second, the data slots may comprise less than eight valid data bits. The number of valid data bits is indicated by a variable delimiter configuration which is not represented in FIG. 2. The control slot contains a first bit G, which is set to 1 when the data slot contains eight valid bits. Then, the receive control slot contains a TR bit which is set to 1 to make a transmit request. The other control bits are common to the transmit and receive control slots, these are one I bit which is used to carry internal control information and three E bits which are used to carry external control information and a parity bit P. The N bit is used for control slot numbering.

In a preferred embodiment of the invention, the code which is used to carry the frames on XMIT and RCV links 4 and 6 is the well known Manchester code. The frame synchronization is performed by a code violation on the first bit of the frames.

The multiplexing/demultiplexing circuit 10 is shown in FIG. 3. It comprises a tranmit part 10-XMIT and a receive part 10-RCV.

In the transmit 10-XMIT, the frames to be transmitted to the equipment users are received from XMIT link 4 by Manchester decoding circuit 50 which generates a frame syncho signal on line 52 at the beginning of the frames and generates a decoded bit stream on line 54. The bit stream from line 54 is inputted into shift register 56 under control of the clock signal on line 8 and the frame synchro signal and the clock signal are provided to slot counter 58. Counter 58 is reset to zero by the frame synchro signal on line 52 and then incremented by 1 each time 16 bits are received. The slot counter content is provided to decoding circuit 60 through bus 62. Decoding circuit 60 provides an active signal on line 64 each time 16 bits have been received in shift register 56 i.e. each time an entity comprising one data slot and one control slot has been received. It also generates active LOAD signals on lines 22-1 to 22-8 at the times the entity of slots assembled in register 56 have to be loaded in the link adapters 12-1 to 12-8 respectively. The LOAD signals on lines 22-1 to 22-8 are provided to link adapters 12-1 to 12-8 to cause the content of shift register 56 to be loaded in selected adapters depending upon which data and control slots are received as described above. In addition, decoding circuit 60 provides a CODE VIOLATION control signals on lines 21-1 to 21-8 when the slot counter 58 reaches 1, 2, 3, 4, 5, 6, 7 and 8 respectively, i.e. at the beginning of the four sets of data and control slot entities which are sent to the link adapters 12-1 to 12-8 in each frame.

The adapter 2 may send commands by means of the I bits. The commands which comprise several bits, are sent by coding the I bits of consecutive slots. The I bit of each slot is provided to AND gate 65 which is conditioned by the active signal on line 64. Thus, the I bit received from each slot provided at the output of AND gate 65 is inputted in shift register 66. Various commands may be sent by the adapter 2. These commands are decoded by decode circuit 68. When command decode circuit 68 decodes in register 66 a command aimed at all or selected active remote modules ARM, the command is provided on bus 18 by gating circuit 70 to be provided to the link adapters 12 under control of the active load signals generated by decode circuit 60 in response to the active remote module address contained in the command which is provided to decode circuit 60. One particular command aimed at all or selected active remote modules is the READ ARM PARAMETERS which is sent at initialization or periodically to identify the plugged modules.

When the command decode circuit 68 decodes a READ memory command at a given address X, gating circuit 70 activates the READ control line 46 and provides the memory address on address bus 43.

In the receive part 10-RCV, the frames are received from the link adapters 12-1 to 12-8 through RCV links 16-1 to 16-8 together with LOAD commands received on lines 23-1 to 23-8. Links 16-1 to 16-8 and lines 23-1 to 23-8 are provided to gating circuit 76 which gates the received data and control slot entities in 16-bit shift register 78 under control of an active LOAD command on one line among line 23-1 to 23-8. The LOAD command lines are activated by link adapters 12-1 to 12-8 as will be described later on.

The content of shift register 78 is shifted under control of clock signals on line 8 and provided to Manchester encoding circuit 80 which generates the received serial bit frames on RCV link 6. Since there is a 16-bit delay between the transmit bit stream and the receive bit stream, the frame synchronization of the received bit stream which is performed by a code violation at the beginning of the frame is controlled by a frame synchro signal on output line 82 of a decoder 84. Decoder 84 decodes the content of slot counter 86 which is equal to the content of slot counter 58 plus 1. Decoder 84 also provides the slot counter value on bus 24 to be provided to link adapters 12-1 to 12-2 through busses 24-1 to 24-8.

Decoder 84 provides an active signal on line 88 at each two-slot time, which conditions AND gate 90.

The data which are read from memory 42 in response to a READ command on line 46 are stored in shift register 92 together with a header configuration H gated from register 94 and gated into register 92 by the active READ command. The header configuration indicates the type of the command which follows. The content of shift register 92 is shifted under control of the clock signal on line 8 through the conditioned AND gate 90 into the I bit position of the control slot in shift register 78 to be sent to the adapter 2 through Manchester encoding circuit 80.

Figure 4:
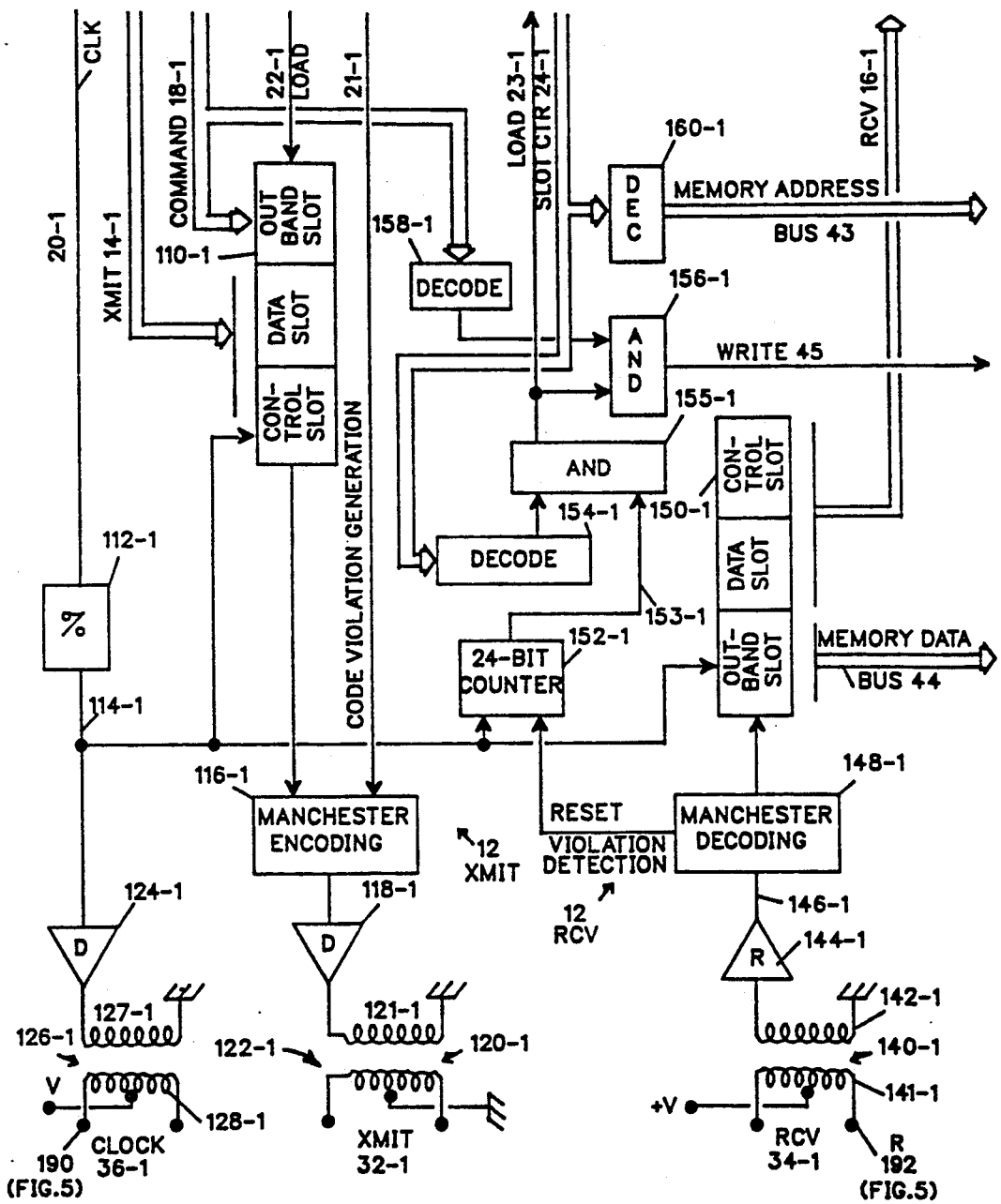
FIG. 4 represents a detailed implementation of a link adapter 12 of FIG. 1.

The link adapters 12-1 to 12-8 are similar, and FIG. 4 shows a detailed implementation of a link adapter, for example link adapter 12-1. They also comprise a transmit part 12-XMIT and a receive part 12-RCV.

The components are referenced by a reference number followed by the suffix 1. The other link adapters 12-2 to 12-8 comprise the same components, which may be designated with suffixes 2 to 8 in the description, they are not shown in the drawings.

Transmit part 12-XMIT of link adapter 12-1 comprises a 24-bit shift register 110-1, the data and control slots contained in register 56 (FIG. 3) are loaded in the two 8-bit stages of register 110-1 when the LOAD signal on line 22-1 is active, i.e when the content of slot counter 58 is equal to 0, 8, 16 and 24. The command, if any which is generated on bus 18-1 is loaded in the remaining 8-bit stage, to add an outband slot to the control and data slots.

The frequency of the clock signal received on line 20-1 is divided in divider 112-1, so as to provide on the output line of divider 112-1 a 768 kilobits per second signal which controls the shifting of the bits from shift register 110-1 to a Manchester encoding circuit 116-1. The coded bit stream with a code violation at the first bit of the slot entity generated under control of the active CODE VIOLATION signal on line 21-1, at the output of Manchester encoding circuit 116-1 is provided to driver 118-1, to be sent to the XMIT pair 32-1 through transformer 120-1. Transformer 120-1 comprises a primary winding 121-1 and a secondary winding 122-1 with a grounded center tap.

The clock signal on line 114-1 is provided to driver 124-1 to be sent on clock pair 36-1 through the transformer 126-1. Transformer 126-1 comprises a primary winding 127-1 and a secondary winding 128-1 with a center tap connected to a negative voltage $-V$.

In the receive part 12-RCV, the bit stream which is received from the receive pair 34-1 is provided to the link adapter through transformer 140-1. Transformer 140-1 comprises a primary winding 141-1 with a center tap connected to a positive voltage $+V$ and a secondary winding 142-1 which provides the received bit stream to a receiver 144-1. The output line 146-1 of receiver 144-1 is provided to Manchester decoding circuit 148-1 and the received bits are inputted into shift register 150-1 under control of the clock signal on line 114-1.

The clock signal on line 114-1 is provided to bit counter 152-1 which is reset to 0 when Manchester decoding circuit 148-1 detects a code violation, and which is incremented by 1 each time 24 bit times are counted. Each time, 24 bits have been counted an active signal is generated on line 153-1. Decoding circuit 154-1 decodes the slot counter value from bus 24-1 and provide an active signal on its output line when the slot counter value is 0, 8, 16 or 24. This output line is provided to AND gate 155-1 together with the line 153-1, to provide the LOAD signal on line 23-1. The data and control slots contained in register 150-1 are provided to RCV bus 16-1. The active signal on line 23-1 conditions AND gate assembly 156-1 which generates the WRITE control signal on its output line 45 if decoding circuit 158-1 decodes a read ARM parameter command on bus 18-1.

The memory address at which the write operation is to be performed is generated on address bus 43 by decoding circuit 160-1 which generates the memory address corresponding to the slot counter value received from bus 24-1. The data to be written into the so addressed memory position are contained in the outband slot, as will be described later on.

As described before, the frame contains 32 data and control slot entities, the entities comprising two such data and control slots are numbered from 0 to 31, and each entities corresponds to one memory position 0 to 31 respectively and to one connector 37-0 to 37-31 to which an equipment user may be connected through an active remote module 31-0 to 31-31. So, the correspondence which exists between the slot entity number 0 to 31 and the connectors 37-0 to 37-3 which are connected to the link adapter 12-1 is the following:

Slot set 0→connector 37-0→memory address 0

Slot set 8→connector 37-1→memory address 1

Slot set 16→connector 37-2→memory address 2

Slot set 24→connector 37-3→memory address 3

The input connector 35-1 (FIG. 5) of the connecting box 30-1 comprises input pin pairs 170-1, 172-1 and 174-1 connected to the transmit wire pair 32-1, receive wire pair 34-1 and clock wire pair 36-1 (FIG. 1).

The printed circuit 176-1 allows the XMIT, RCV and CLOCK pairs 170-1, 172-1 and 174-1 to be connected to corresponding pin pairs in connectors 37-0, 37-1, 37-2 and 37-3, such as 178-0, 180-0 and 182-0 in connector 37-0.

Connectors 37-0 to 37-3 comprise two address pins 184-0 to 184-3. Address pins 184-0 of connector 37-0 are both connected to a 0 bolt voltage generated at the middle point 185 of resistor bridge comprising resistors 186 and 188 connected to wires 190 and 192 onto which opposite voltages are generated by transformers 128-1 and 141-1 (FIG. 4).

Figure 6B:
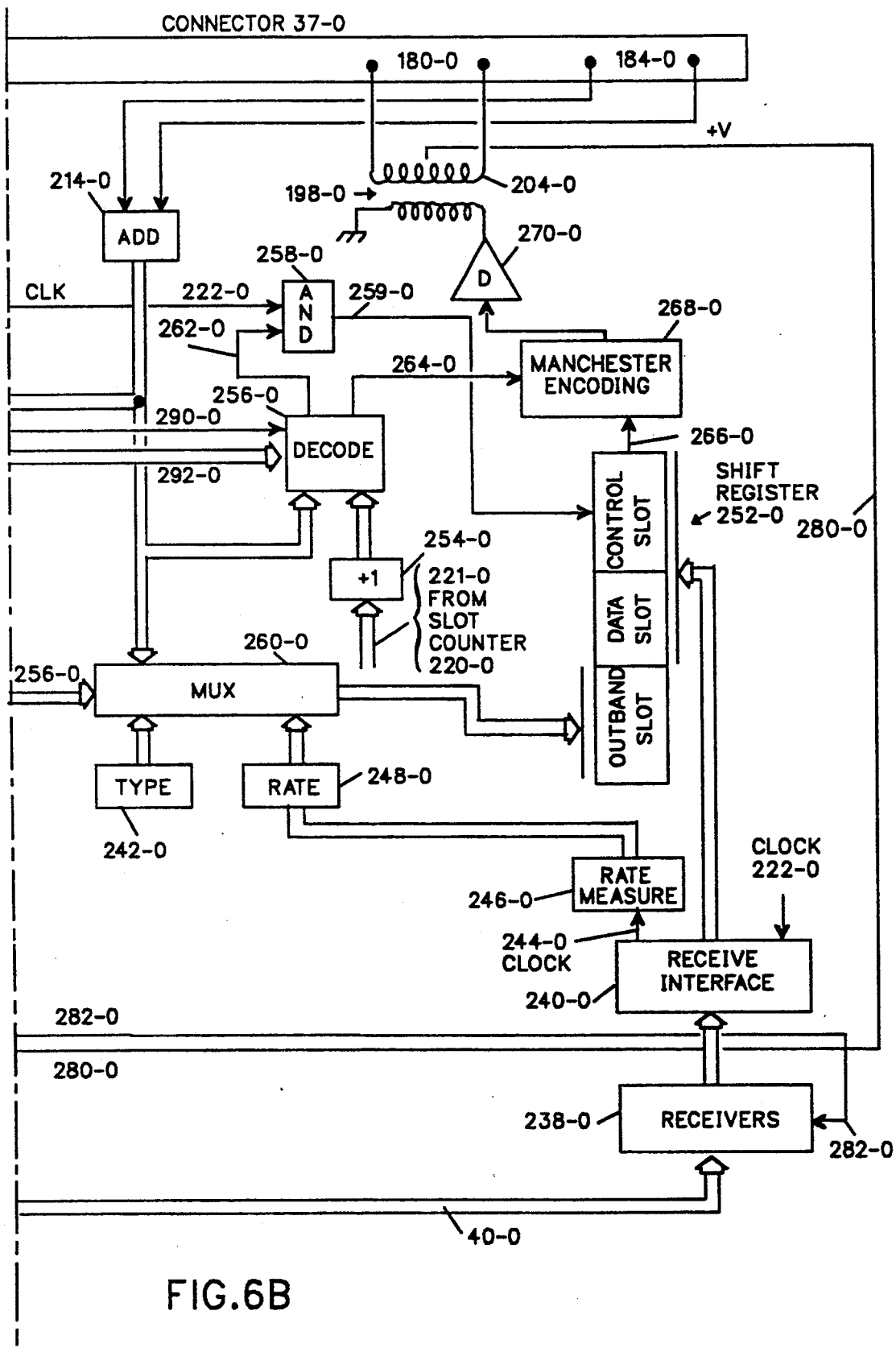

In connector 37-1 the right address pin is connected to point 185 and the left one is left floating. In connector 37-2 the left address pin is connected to point 185 and the right one is left floating and in connector 37-3 both address pins are left floating. FIG. 6 represents an active remote module, for example module 31-0 when connected to connector 37-0.

The module comprises transformers 196-0, 198-0 and 200-0. The primary windings 202-0, 204-0 and 206-0 are connected to pins 178-0, 180-0 and 182-0 in connector 37-0.

The transformer arrangements allow the 0 Volt voltage, $+V$ voltage and $-V$ voltage to be generated on the center taps of the windings 202-0, 204-0 and 206-0, to provide the supply voltages in the active remote module 31-0.

In addition, the transmit bit stream provided on XMIT pair 32-1 is provided by transformer 196-0 to a driver 210-0 and the clock signal provided on CLOCK pair 36-1 is provided to driver 212-0.

When the active remote module is plugged into connector 37-0, the ARM address is entered into address register 214-0. The slot entities to be sent by the module to the attached user equipment UE depends upon the module address, for example the slot entities 0, 8, 16 and 24 are provided by link adapter 1 on long cable 28-1, these slot entities sequence is provided by driver 210-0 to Manchester decoding circuit 216-0. Manchester decoding circuit 216-0 detects the code violation on the first bit of slot entity 0 and activates synchro line 218-0 in response thereto. This active signal resets slot counter 220-0 which counts the bit clock pulses received from driver 212-0 on line 222-0.

Counter 220-0 is incremented by 1 each time 24 bit clock pulses have been counted. The counter value is provided to decoder 224-0 together with the module address from register 214-0. Thus, decoder 224-0 provides an active signal on its output line 226-0 when the value provided by the counter is validated by the module address, i.e. for module 31-0, when the value provided by the counter 220-0 is 0. The active signal on line 226-0 conditions AND gate 228-0 which receives the decoded bit stream from Manchester decoding circuit 216-0 and thus gates the 24 bits comprised in the control, data and outband slots of the slot entity, into shift register 230-0 under control of the clock signal on line 222-0.

Decoder 224-0 provides an active signal on its output line 232-0 when the value contained in slot counter 220-0 is equal to the value validated by the module address plus one, i.e. when the 24 bits have been assembled in register 230-0. This signal is provided to an XMIT interface circuit 234-0 to initiate the transmission of the data bits and control bits to the connected user equipment through drivers 236-0 and terminating connector 41-0.

The data bits and control bits received from the connected user equipment through receivers 238-0 are provided to a receive RCV interface circuit 240-0, which transform them into data and control slot entities having the format described in FIG. 2.

The XMIT interface circuit 234-0 and the RCV interface circuit 240-0 perform for one equipment user, the functions performed in line interface cards LIC for four user equipments and described in above referenced U.S. patent. The LIC adapts the data bits and control bits to be transmitted through the standardized interface of the connected user equipment, and the received data bits and control bits to the format of the data and control slots.

As will be described later on, they comprise additional logic arrangements which are specific to the module type.

The module type parameter is recorded in register 242-0. The receive interface circuit 240-0 retrieves from the received data, the bit clock signal of the received bit stream, which is provided from line 244-0 to a bit rate measurement circuit 246-0 which records the user equipment data rate in register 248-0 as one parameter of the active remote module.

The data and control slots arranged by receive interface circuit 240-0 are loaded into two 8-bit stages of a three 8-bit stage shift register 252-0.

The outband slot assembled in the outband stage of register 230-0 is provided to decoder circuit 254-0, the output bus 256-0 of which is activated when a READ ARM PARAMETER command sent by the adapter 2 is found in the outband slot contained in register 230-0. In response to the activation of bus 256-0, multiplex circuit 260-0 gates the requested ARM parameters from registers 214-0, 242-0 and 248-0 into the third stage of shift register 252-0, to be sent in the outband slot with the data and control slots.

A gating circuit comprising incrementing circuit 254-0, decoding circuit 256-0 and AND gate 258-0 provides the clock signal on line 259-0, to shift the content of register 252-0 at the appropriate times. Incrementing circuit 254-0 increments the value contained in slot counter 220-0 by 1. The output of incrementing circuit 254-0 is provided to decoding circuit 256-0 which also receives the module address from address register 214-0. The decoding circuit 256-0 provides an active signal on its output line 262-0 which is provided to one input of AND gate 258-0 to gate the clock signal from line 222-0 on shift control line 259-0. Decoding circuit 256-0 also provides a code violation control signal on line 264-0, when the module is plugged in the left most position of the connecting box, as indicated by the address value contained in address register 214-0.

The content of register 252-0 is thus shifted on line 266-0 and provided to Manchester encoding circuit 268-0. The encoded bits at the output of circuit 268-0 are provided to driver circuit 270-0, to be provided onto connector pins 180-0 through transformer 198-0.

In a preferred embodiment of the invention, the voltages which are needed in the ARM modules are provided from the link adapters through the transformer arrangement. More particularly, the $+V$ and $-V$ voltages are provided to drivers and receiver circuits 236-0 and 238-0 on lines 280-0 and 282-0.

The operation of the system will now be described. During an initialization phase and then, during updating phases, the adapter 2 sends a general READ ARM PARAMETER command which is dispatched to all link adapters 12-1 to 12-8. The plugged ARM modules respond by providing their parameters in the receive outband slots and the parameters are stored in memory 42.

Then, the adapter 2 sends READ memory commands, and in response thereto it receives the parameters and positions of the plugged ARM modules. In case, active remote modules operating at data rate higher than 64 kilobits per second are plugged into the identified connecting boxes, the microcode running in the adapter microprocessor sends ENABLE and DISABLE commands to the active remote modules of said identified connecting boxes to assign more than one slot to selected modules (ENABLE command) and disable the others (DISABLE command) depending upon the data rates of the connected high speed user equipment.

For example, assuming that a user equipment working at 256 kilobits per second is attached through ARM modules 31-1 and that user equipment working at 64 kilobits per second are attached through ARM modules 31-0, 31-2 and 31-3, the microcode sends DISABLE commands to ARM modules 31-0, 31-2 and 31-3. These commands are received in outband slot stage of registers 230-0, 230-2 and 230-3 and decoded by decoding circuits 254-0, 254-2 and 254-3 which activate their output lines 290-0, 290-2 and 290-3. These lines are provided to decoding circuits 221-0, 221-2, 221-3 and 262-0 262-2, 262-3, which prevent AND gates 228-0, 228-2, 228-3 and 258-0, 258-2 and 258-3 from being conditioned, which disables ARM 31-0, 31-2 and 31-3.

At the same time, an ENABLE command is sent by the microcode running in the adapter microprocessor to ARM module 31-1 together with the assigned slot number. This command is recognized by decoder 254-1 which activates bus 292-1 with a code indicative of the slot numbers assigned to the so enabled ARM module. This code is provided to decoding circuit 224-1 and 264-1 so as to condition AND gates 228-1 and 260-1 to have the four slot entities processed by module 31-1.

According to the present invention, the user equipments are connected to the line adapters of the communication controller such as line adapter 2 through terminating connectors 42 and ARM modules 31 which fit with the standardized interfaces of the user equipments.

Generally, standardized interface leads comprise transmit and receive leads for the data bits and control leads for control information.

To receive and transmit all control lead information, with only three external control bits E0, E1 and E2 in the control slots of the receive and transmit interfaces 240 and 234 in the ARM modules, the control leads have been classified in three groups:

GROUP 1

Fast refresh control leads. The information on these leads need to be taken into account (i.e. refresh) in the control slot assigned to the attached user of every frame.

GROUP 2

Medium refresh control leads. The information on these leads need to be refreshed in the control slot assigned to the attached user of every second frame.

GROUP 4

Low refresh control leads. The information on these lead need to be refreshed in the control slot assigned to the attached user of every fourth frame.

The following tables 1 to 5, list the standardized interfaces presently available and the class of the group of each control lead. They also indicate how the control slot CS bits E0, E1 and E2 are used to carry the control lead information. In the tables K is an integer number which takes to successive values 0, 1, 2 etc..

TABLE 1-1

| | V24 INTERFACE LEAD | | | |
|---|---|---|---|---|
| CS BIT | INTERFACE CONTROL LEADS | GROUP CLASS | OCCURENCE | FRAME N° |
| MODEM OUT LEADS | | | | |
| E0 | REMOTE LOOP BACK | 4 | 1/4 | 0 + 4K |
| E1 | REQUEST TO SEND | 1 | 1/1 | 0 + K |
| E2 | LOCAL LOOP BACK | 4 | 1/4 | 0 + 4K |
| E0 | SIGNALLING RATE SELEC. | 4 | 1/4 | 1 + 4K |
| E1 | REQUEST TO SEND | 1 | 1/1 | 0 + K |
| E2 | NEW SYNC | 2 | 1/2 | 0 + 2K |
| E0 | DATA TERMINAL READY | 4 | 1/4 | 2 + 4K |
| E1 | REQUEST TO SEND | 1 | 1/1 | 0 + K |
| E2 | NOT USED | 4 | 1/4 | 2 + 4K |
| E0 | NOT USED | 4 | 1/4 | 3 + 4K |
| E1 | REQUEST TO SEND | 1 | 1/1 | 0 + K |
| E2 | NEW SYNC | 1 | 1/2 | 1 + 2K |

TABLE 1-2

| CS BIT | INTERFACE CONTROL LEADS | GROUP CLASS | OCCURENCE | FRAME N° |
|---|---|---|---|---|
| MODEM IN LEADS | | | | |
| E0 | NOT USED | 4 | 1/4 | 0 + 4K |
| E1 | RECEIVED LINE (RLSD) | 1 | 1/1 | 0 + K |
| E2 | TEST INDICATOR | 4 | 1/4 | 0 + 4K |
| E0 | NOT USED | 4 | 1/4 | 1 + 4K |
| E1 | RECEIVED LINE (RLSD) | 1 | 1/1 | 0 + K |
| E2 | CLEAR TO SEND (RFS) | 2 | 1/2 | 0 + 2K |
| E0 | DATA SET READY (DSR) | 4 | 1/4 | 2 + 4K |
| E1 | RECEIVED LINE (RLSD) | 1 | 1/1 | 0 + K |
| E2 | RING INDICATOR | 4 | 1/4 | 2 + 4K |
| E0 | NOT USED | 4 | 1/4 | 3 + 4K |
| E1 | RECEIVED LINE (RLSD) | 1 | 1/1 | 0 + K |
| E2 | CLEAR TO SEND (RFS) | 2 | 1/2 | 1 + 2K |

TABLE 2

| | V25 INTERFACE LEADS | | | |
|---|---|---|---|---|
| CS BIT | INTERFACE CONTROL LEADS | GROUP CLASS | OCCURENCE | FRAME N° |
| MODEM OUT LEADS | | | | |
| E0 | DIGIT SIGNAL 8 | 4 | 1/4 | 0 + 4K |
| E1 | DIGIT SIGNAL 4 | 4 | 1/4 | 0 + K |
| E2 | DIGIT SIGNAL 2 | 4 | 1/4 | 0 + 4K |
| E0 | DIGIT SIGNAL 1 | 4 | 1/4 | 1 + 4K |
| E1 | CALL REQUEST | 4 | 1/4 | 0 + 4K |
| E2 | DIGIT PRESENT | 4 | 1/4 | 0 + 4K |
| MODEM IN LEADS | | | | |
| E0 | AUTOCALL BOX POWER ID | 4 | 1/4 | 0 + 4K |
| E1 | DATA LINE OCCUPIED | 4 | 1/4 | 0 + 4K |

TABLE 2-continued

| | V25 INTERFACE LEADS | | | |
|---|---|---|---|---|
| CS BIT | INTERFACE CONTROL LEADS | GROUP CLASS | OCCURENCE | FRAME N° |
| E2 | PRESENT NEXT DIGIT | 4 | 1/4 | 0 + 4K |
| E0 | ABANDON CALL AND RETRY | 4 | 1/4 | 1 + 4K |
| E1 | CALL ORIGINATION STAT | 4 | 1/4 | 0 + 4K |
| E2 | NOT USED | 4 | 1/4 | 0 + 4K |

TABLE 3

| | BELL 303 INTERFACE LEADS | | | |
|---|---|---|---|---|
| CS BIT | INTERFACE CONTROL LEADS | GROUP CLASS | OCCURENCE | FRAME N° |
| MODEM OUT LEADS | | | | |
| E0 | DATA TERMINAL READY | 4 | 1/4 | 2 + 4K |
| E1 | REQUEST TO SEND | 1 | 1/1 | 0 + K |
| E2 | NOT USED | 4 | 1/4 | 0 + 4K |
| E0 | NOT USED | 4 | 1/4 | 1 + 4K |
| E1 | REQUEST TO SEND | 1 | 1/1 | 0 + K |
| E2 | NOT USED | 4 | 1/4 | 1 + 4K |
| MODEM IN LEADS | | | | |
| E0 | DATA SET READY (DSR) | 4 | 1/4 | 2 + 4K |
| E1 | AUTOMATIC GAIN CONTROL | 1 | 1/1 | 0 + K |
| E2 | NOT USED | 4 | 1/4 | 0 + 4K |
| E0 | NOT USED | 4 | 1/4 | 1 + 4K |
| E1 | AUTOMATIC GAIN CONTROL | 1 | 1/1 | 0 + K |
| E2 | READY FOR SENDING(CTS) | 2 | 1/2 | 1 + 2K |

TABLE 4-1

| | V35 INTERFACE LEADS | | | |
|---|---|---|---|---|
| CS BIT | INTERFACE CONTROL LEADS | GROUP CLASS | OCCURENCE | FRAME N° |
| MODEM OUT LEADS | | | | |
| E0 | NOT USED | 4 | 1/4 | 0 + 4K |
| E1 | REQUEST TO SEND | 1 | 1/1 | 0 + K |
| E2 | MODEM TEST | 4 | 1/4 | 0 + 4K |
| E0 | NOT USED | 4 | 1/4 | 1 + 4K |
| E1 | REQUEST TO SEND | 1 | 1/1 | 0 + K |
| E2 | NEW SYNC | 2 | 1/2 | 1 + 2K |
| E0 | NOT USED | 4 | 1/4 | 2 + 4K |
| E1 | REQUEST TO SEND | 1 | 1/1 | 0 + K |
| E2 | NOT USED | 4 | 1/4 | 2 + 4K |
| E0 | NOT USED | 4 | 1/4 | 3 + 4K |
| E1 | REQUEST TO SEND | 1 | 1/1 | 0 + K |
| E2 | NEW SYNC | 2 | 1/2 | 1 + 2K |

TABLE 4-2

| CS BIT | INTERFACE CONTROL LEADS | GROUP CLASS | OCCURENCE | FRAME N° |
|---|---|---|---|---|
| MODEM IN LEADS | | | | |
| E0 | NOT USED | 4 | 1/4 | 0 + 4K |
| E1 | RECEIVED LINE (RLSD) | 1 | 1/1 | 0 + K |
| E2 | TEST INDICATOR | 4 | 1/4 | 0 + 4K |
| E0 | NOT USED | 4 | 1/4 | 1 + 4K |
| E1 | RECEIVED LINE (RLSD) | 1 | 1/1 | 0 + K |
| E2 | READY FOR SENDING(CTS) | 2 | 1/2 | 1 + 2K |
| E0 | DATA SET READY | 4 | 1/4 | 2 + 4K |
| E1 | RECEIVED LINE (RLSD) | 1 | 1/1 | 0 + K |
| E2 | NOT USED | 4 | 1/4 | 2 + 4K |
| E0 | NOT USED | 4 | 1/4 | 3 + 4K |
| E1 | RECEIVED LINE (RLSD) | 1 | 1/1 | 0 + K |
| E2 | READY FOR SENDING(CTS) | 2 | 1/2 | 1 + 2K |

TABLE 5

X21 INTERFACE LEADS
OCCURENCE E0/E1/E2 1/1 AND FRAME NUMBER 0 + K

MODEM OUT LEADS

| E0 | E0 = 1 | E0 = 0 | | | | |
|---|---|---|---|---|---|---|
| E1 | E1 = 0 | E1 and E2 (see TABLE) | E1 | E2 | 0 | T |
| | | TX disable | 0 | 0 | 0 | 0 |
| E2 | E2 = X | | | | | |
| | (not Significant) | | | | | |

MODEM IN LEADS

X21 INTERFACE LEADS
OCCURENCE E0/E1/E2 1/1 AND FRAME NUMBER 0 + K

| E0 | E0 = 0 | E0 = 1 STATE | | | |
|---|---|---|---|---|---|
| E2 | E2 = 1 | CONFIRMED 16 BIT TIMES OR E0 · E2 = 00 OR CLEAR TO CONFIRM 10 ms | | | |
| E1 | E1 = 1 | E1 and E2 (see TABLE) | E0 | E1 | E2 |
| | | READY FOR DATA | 1 | 1 | 1 |
| | | DCE READY | 1 | 0 | 1 |
| | | CONTROLLED NOT | 1 | 1 | 0 |

TABLE 5-continued

X21 INTERFACE LEADS
OCCURENCE E0/E1/E2 1/1 AND FRAME NUMBER 0 + K

| | | | |
|---|---|---|---|
| READY | | | |
| DCE CLEAR OR CLEAR TO CONFIRM (10 mS) | 1 | 0 = 1 | 0 = R |
| LOOP 2 CONFIRMED | 1 | 0 | 1 |
| LOOP 3 CONFIRMED | 0 | 1 | 0 |

TABLE 6-1
RS499 INTERFACE LEADS

| CS BIT | INTERFACE CONTROL LEADS | GROUP CLASS | OCCURENCE | FRAME N° |
|---|---|---|---|---|
| MODEM OUT LEADS | | | | |
| E0 | REMOTE LOOP BACK | 4 | 1/4 | 0 + 4K |
| E1 | REQUEST TO SEND | 1 | 1/1 | 0 + K |
| E2 | LOCAL LLOP BACK | 4 | 1/4 | 0 + 4K |
| E0 | SELECT FREQUENCY | 4 | 1/4 | 1 + 4K |
| E1 | REQUEST TO SEND | 1 | 1/1 | 0 + K |
| E2 | NEW SIGNAL | 2 | 1/2 | 1 + 2K |
| E0 | TERMINAL READY | 4 | 1/4 | 2 + 4K |
| E1 | REQUEST TO SEND | 1 | 1/1 | 0 + K |
| E2 | TERMINAL IN SERVICE | 4 | 1/4 | 2 + 4K |
| E0 | SELECT STANDBY | 4 | 1/4 | 3 + 4K |
| E1 | REQUEST TO SEND | 1 | 1/1 | 0 + K |
| E2 | NEW SIGNAL | 2 | 1/2 | 1 + 2K |

TABLE 6-2
RS499 INTERFACE LEADS

| CS BIT | INTERFACE CONTROL LEADS | GROUP CLASS | OCCURENCE | FRAME N° |
|---|---|---|---|---|
| MODEM IN LEADS | | | | |
| E0 | SIGNAL QUALITY | 4 | 1/4 | 0 + 4K |
| E1 | RECEIVER READY(RLSD) | 1 | 1/1 | 0 + K |
| E2 | TEST MODE (TI) | 4 | 1/4 | 0 + 4K |
| E0 | SIGNAL RATE INDICATOR | 4 | 1/4 | 1 + 4K |
| E1 | RECEIVER READY(RLSD) | 1 | 1/1 | 0 + K |
| E2 | CLEAR TO SEND (RFS) | 2 | 1/2 | 1 + 2K |
| E0 | DATA MODE (DSR) | 4 | 1/4 | 2 + 4K |
| E1 | RECEIVER READY(RLSD) | 1 | 1/1 | 0 + K |
| E2 | INCOMING CALL (RI) | 4 | 1/4 | 2 + 4K |
| E0 | STANDBY INDICATOR | 4 | 1/4 | 3 + 4K |
| E1 | RECEIVER READY(RLSD) | 1 | 1/1 | 0 + K |
| E2 | CLEAR TO SEND (RFS) | 2 | 1/2 | 1 + 2K |

In addition to the transmit and receive circuits which are provided in the transmit and receive interface 234 and 240 of the ARM module to transform the data and control slot bits in serial data bits and control bits which may be provided to the drivers 236 and to arranged the bits received from the receivers 282 in data and control slot, the transmit and receive interfaces 234 and 240 comprise a logic circuit which is specific to each standardized interface, such as described in the tables.

Figure 7:
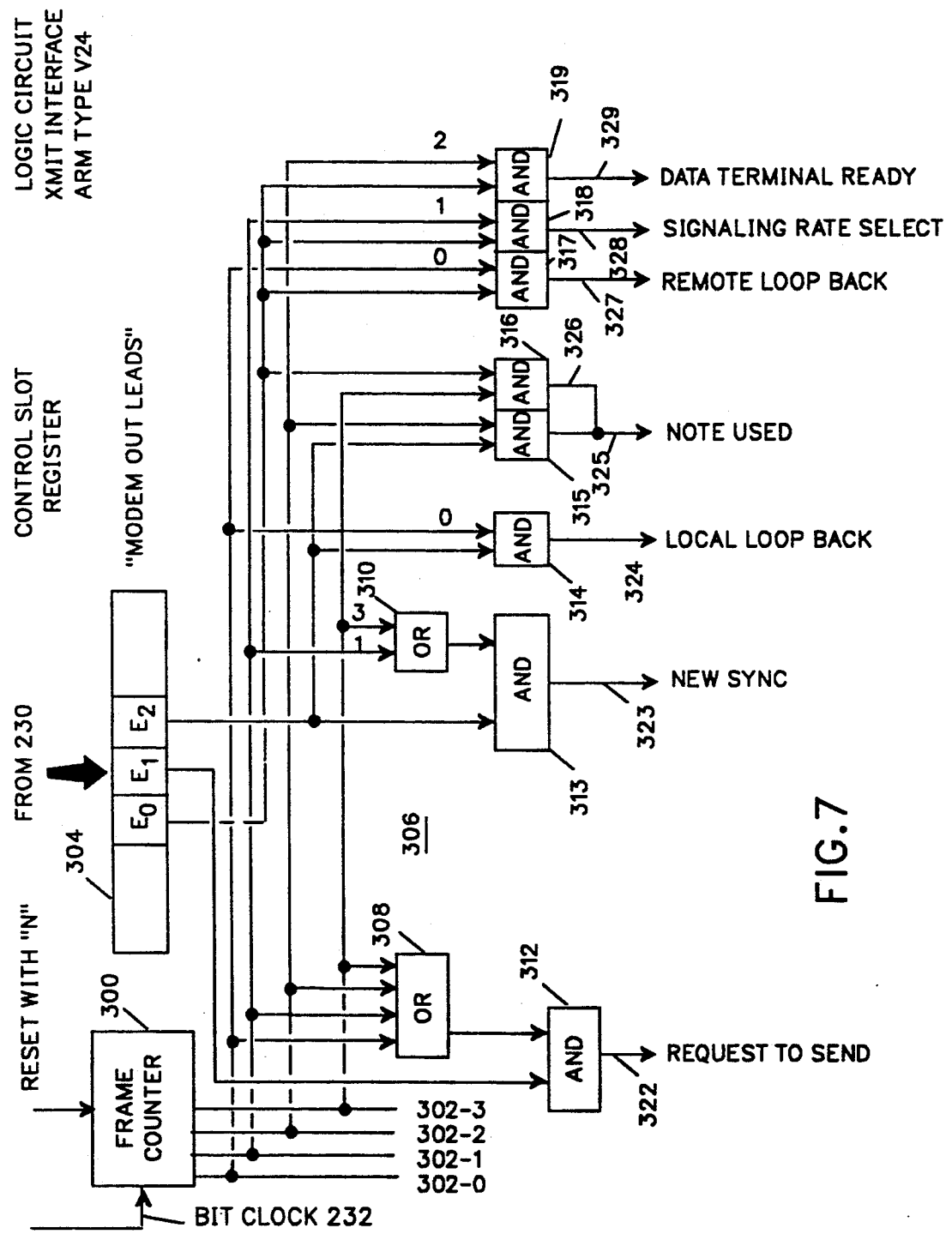
FIG. 7 represents the logic circuit in the XMIT interface of an active remote module, which is specific to the V24 interface.
Figure 8:
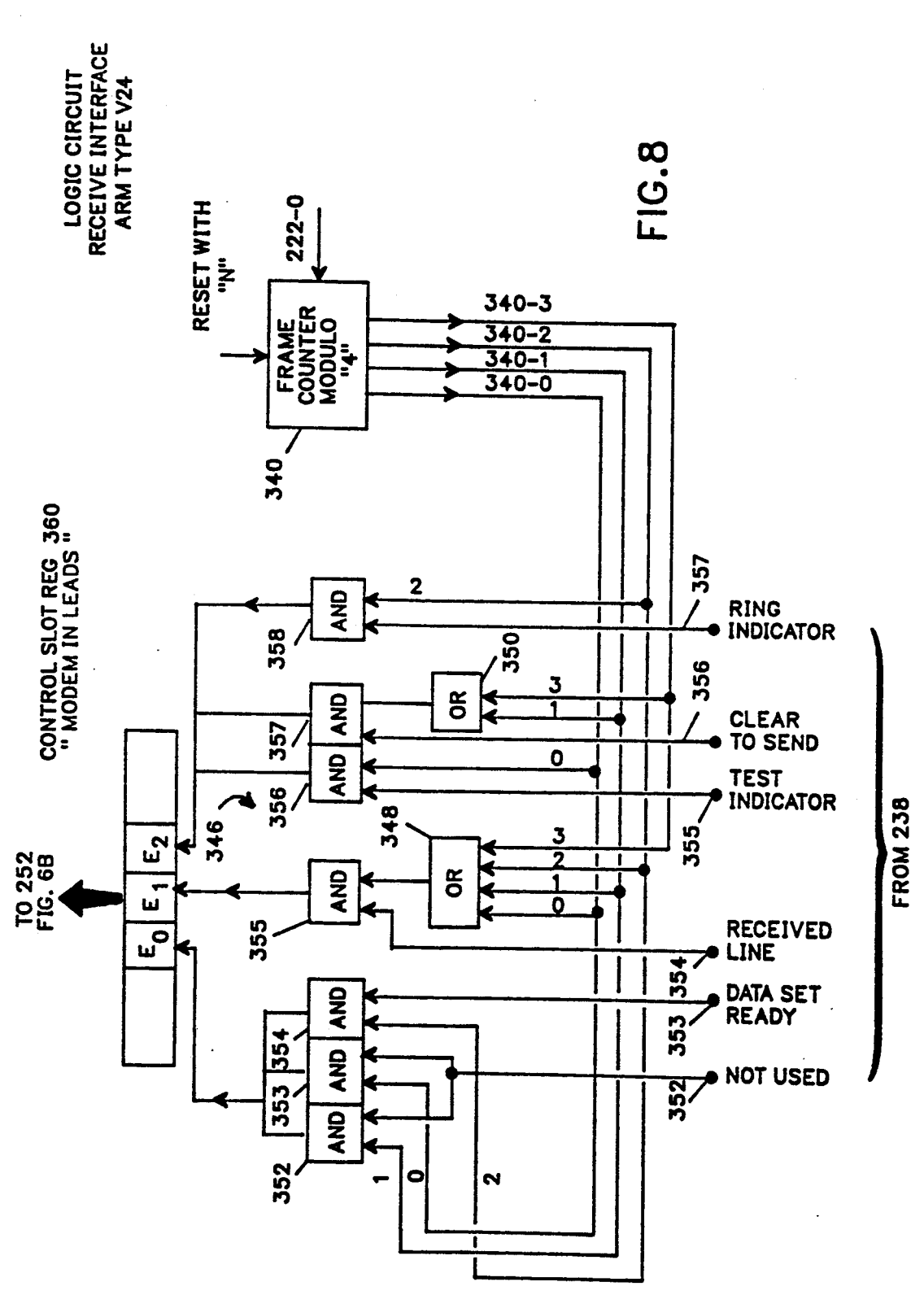

FIGS. 7 and 8 represent the logic circuits which have to be implemented in the transmit and receive interfaces 234 and 240 of the ARM module which is to be used when an equipment user with a standardized interface of the V24 type has to be connected to the communication controller. The modem out and modem in control leads of this interface are shown in tables 1-1 and 1-2.

The information which is given in the tables 2 to 5 allow the logic circuits provided in the transmit and receive interfaces 234 and 240 of the ARM modules of other standardized interfaces, to be implemented easily.

As shown in FIG. 7, the logic circuit in Xmit interface 234 for accommodating a V24 standardized interface comprises a frame counter 300 which is a modulo 4 counter, able to count the successive frames, under control of the bit clock signal on line 232, and is reset to 0 by the N bit of the control slot at frame 0. Counter 300 provides an active signal on line 302-0 at frame Number 0+4K, it provides an active signal on line 302-1 at frame Number 1+4K, it provides an active signal on line 302-2 at frame Number 2+4K and it provides an active signal on line 302-3 at frame Number 3+4K, K being an integer number 0, 1, 2 ... etc.

The adapter 2 sends the control bits to be provided on the control leads in successive frames as indicated in table 1-1. The control bits E0, E1 and E2 received in control slot stage of shift register 230 are inputted in a control slot register 304. The E0, E1 and E2 bits received in register 304 are provided to a gating arrangement comprising OR circuits 308 and 310 and AND circuits 312 to 319 which provides on their output lines 322 to 329 respectively, the signals to be provided to the control leads of the standardized interface V24, as indicated in table 1-1. The gating of the E0, E1 and E2 bits in register 304 onto lines 322 to 329 is performed under control of the active signals on output lines 302-0 to 302-3 of frame counter 300 according to the group of the interface leads 322 to 329, as indicated in table 1-1.

The logic circuit in receive interface 240 is shown in FIG. 8. It also comprises a frame counter 340 which is a modulo 4 counter and is reset at frame 0 by the N bit contained in the control slot. It provides active signals on its output lines 304-0, 304-1, 304-2 and 304-3 at frame number 0+4k, 1+4K, 2+4K and 3+4K, respectively. These lines are provided to gating arrangement 346 which comprises OR circuits 348 and 350 and AND gates 352 to 358, to gate at the right times, the control bits on control leads 352 to 357, into the three bit positions E0, E1 and E2 of a control slot register 360, according to the group of the interface leads 352 to 357, as indicated in table 1-2.

We claim:

1. Interconnection system for attaching a number n of equipment users (EU) through their standardized interface leads to at least one line adapter means (2) of a communication processing unit, wherein the at least one line adapter means has a transmit serial link (4) and a receive serial line (6) on which data and control information are carried in data and control slot entities with at least one entity for each user equipment which may be attached to the at least one line adapter means, and a plurality of entities forming frames which are carried on the transmit and receive links in periods T, each control slot comprising at least one internal control bit I for carrying control information for the internal operation of the communication processing unit and at least one external control bit E for carrying control information from or to the user equipment, said interconnection system being characterized in that it comprises:

dispatching means (10, 12) connected to the transmit and receive serial links and having pairs of output and input serial links (32, 34) said dispatching means comprising:

first transmitting means (10-XMIT, 12-XMIT) which receives the data and control slot entities from the transmit serial link (4) and assemble distinct sets of data and control slot entities therefrom and add an outband slot to each data and control slot entity, and provides each one of the sets of data, control and outband slots on one output serial link (32) among the output serial links, in a frame period T, first receiving means (10-RCV, 12-RCV) for building the frames to be sent on the receive serial link (6) from bits received on the input serial link (34), remote connecting means (28, 30), each one comprising a long distance transmission means (28) and a connecting box (30) provided with a plurality of identical connecting interfaces (37), the plurality of connecting interfaces of a connecting box being connected to one pair of output and input serial links among the pairs, through the long distance transmission means, active remote attachment means (31, 40, 41) which are specific to the user equipment standardized interfaces, each user equipment being attached to the line adapter through the active remote attachment means (31, 40, 41) connected to a connecting interface, each active remote attachment means adapting the standardized interface of the connected user equipment to the connecting interface (37), said active remote attachment means comprising:

second transmitting means (FIG. 6-A) connected to the output serial link and second receiving means (FIG. 6-B) for providing the user equipment data and control bits arranged in data and control slots on the input serial link of the first receiving means, the second transmitting means selecting in each sets of data, control and outband slots, the set which is assigned to the connected user equipment and being responsive to commands sent by the line adapter by means of the internal bits, which are received through the outband slot for generating the responses to the commands which are returned to the at least one line adapting means through the second receiving means in an outband slot added to the data and control slots from the connected equipment user.

2. Interconnection system according to claim 1 characterized in that:

the active remote attachment means further comprises address storing means (214) and parameter storing means (248, 242) for storing the type of standardized interface which may be attached to the active remote attachment means, each connecting box comprises address generating means (38) which provide a specific address to each connecting interface, so that when a user equipment is connected through the active remote attachment means to the connecting interface, the connecting interface address is stored into the address register of the active remote attachment means, and the active remote attachment means are responsive to an identification command generated by said at least one line adapter means requesting the identification of the active remote attachment means and received from the at least one line adapter means in the outband slot for causing the content of the address and parameter storing means to be returned by the second receiving means in the outband slot.

3. Interconnection system according to claim 2 characterized in that it comprises a memory (42) having a plurality of storing positions, each position being assigned to each connecting interface, for storing the address and parameter which characterize the active remote attachment means connected to the connecting interface, if any, and which are returned by the second receiving means, said memory being accessed by the at least one line adapter means by means of read memory commands which are sent through internal control bits I of successive control slots, which causes the information read from the addressed memory position to be provided to the at least one line adapter means through the internal control bits I of successive control slots on the receive serial link (6).

4. Interconnection system according to claim 3 characterized in that the first transmitting means (10-XMIT and 12-XMIT) comprise:

slot entity counting means (58, 59) which count slot entities in each frame, multiplexing means (10-XMIT) having a plurality of output busses (14) and receiving the control and data slot entities from the transmit serial link (4) and providing in parallel on each but among the plurality of output busses (14), distinct data and control slot entities from each frame, under control of the slot entity counting means, command receiving means (65, 68 and 70) receiving the internal control bits I of the successive control slots for assembling command words and decoding said words and being responsive to the commands aimed at the connecting interfaces, for providing said commands on the plurality of command output busses (18), a plurality of transmit adapting means (12-XMIT) each one having one output serial link and receiving a set of distinct data and control slot entities from each frame and adding thereto the outband slots, for reconstructing frames portions only comprising data, control and outband slots onto its portion serial link (32), the outband slots being filled with the commands received from one command output bus.

5. Interconnection system according to claim 4 characterized in that the first receiving means comprise:
- a plurality of receive adapting means (12-RCV), each one receiving distinct data, control and outband slot entities from one input serial link (34), and providing the data and control slot entities in parallel on its output bus (RCV-16),
- command decoding means (158) which are responsive to identification commands received from the command output bus to write the content of the outband slot into the memory position the address of which is determined by the slot entity counting means,
- demultiplexing means (10-RCV) which are connected to the receive output busses of the receive adapting means for building frames from the data and control slot entities received from the receive adapting means under control of the slot entity counting means, and sending the frames serially on the receive interface link (6), said demultiplexing means being responsive to a read memory command received by the command receiving means in the multiplexing means for providing the information read from the memory position the address of which is determined by the slot entity counting means, through the internal control bits I of successive control slots which are sent on the receive interface link (6).

6. Interconnection system according to claim 4 characterized in that:
- the transmit adapting means comprise voltage transforming means (120) having a primary winding and a secondary winding, the primary winding receiving the serial bit stream generated by the transmit adapting means, said bit stream being provided by the secondary winding on the serial output link (32), said secondary winding having a center tap which is connected to a first reference voltage (ground),
- the active remote attachment means comprises an input voltage transforming means (196), having a primary and a secondary winding, the primary winding being connected to the output serial link through the connecting interface for receiving the bit stream generated by the transmit adapting means and providing said bit stream to the second transmitting means (FIG. 6-A), said primary winding having a center tap which is connected to the first reference voltage (ground).

7. Interconnection system according to claim 5 characterized in that:
- the receive adapting means comprise voltage transforming means (140) having a primary winding and a secondary winding, the primary winding receiving the serial bit stream from the input serial link (34), said bit stream being provided by the secondary winding to the receive adapting means, said primary winding having a center tap which is connected to a second reference voltage (+V),
- the active remote attachment means comprises an input voltage transforming means (198), having a primary and a secondary winding, the primary winding being connected to the second receiving means and the secondary winding being connected to the connecting interface for providing the received bit stream to the first receiving means, said secondary winding having a center tap which is connected to the second reference voltage (+V).

8. Interconnection system according to claim 1 characterized in that the second transmitting means comprise first control bit arranging means (234-FIG. 6A) which is specific to a standardized interface, to provide control bits onto control leads of the standardized interface by classifying the control leads in different classes depending upon whether the control leads have to be refreshed at each frame, or every second, or every fourth frame, and applying E bits (FIG. 7) received in each frame on control leads selected as a function of their class.

9. Interconnection system according to claim 1 characterized in that the first receiving means comprise second control bit arranging means (240-FIG. 8) which is specific to a standardized interface, to provide the control bits received from the control leads of the standardized interface on a limited number of external control bits which is lower than the number of control leads, by classifying the control leads in different classes depending upon whether the control bits received on the control leads of the standardized interface have to be sent to the at least one line adapter at each frame, or every second, or every fourth frame, and providing the control bits received from the control leads in E bits of the control slots assembled by the receiving means as a function of their class.

10. Interconnection system according to claim 1 characterized in that the second transmitting and receiving means are responsive to DISABLE commands received from the at least one line adapter means through the internal control bits assembled in the outband slot for preventing the data and control bits received by said second transmitting means in the slots assigned to the connected equipment user from being sent to the equipment user, and the data and control bits received from the equipment user to be sent to the line adapter.

11. Interconnection system according to claim 10, characterized in that the second transmitting and receiving means in the active remote attachment means are responsive to ENABLE commands received from the at least one line adapter means through the internal control bits received by the said second transmitting means for assigning more than one data and control slot entities in the frames to the equipment user attached through the active remote attachment means.

12. An interconnection system for attaching a plurality of user devices through their standardized interfaces to at least one line adapter means of a communications controller having a transmit serial link and a receive serial link on which data and control information are carried in data and control slot entities with at least one entity for each user device which may be coupled to the at least one line adapter means and a plurality of entities forming frames which are transmitted on the transmit and receive links in period T, said interconnection system comprising:
- a dispatching means coupled to the transmit and receive serial links and having pairs of input and output serial links; said dispatching means including: first transmitting means which receives the data and control slot entities from the transmit serial link and assemble distinct sets of data and control slot entities therefrom and concatenate on outband slot to each data and control entity and outputs each one of the sets of data control and outband slots on selected ones of the output serial links, in a frame period T;

first receiving means for generating the frames to be sent on the receive serial link from bits received on input serial line (34);

at least one remote connecting means (30) having a single connecting interface for coupling to one pair of the input and output serial links and a plurality of output interfaces; and a plurality of active remote attachment means, each one including circuits to support a specific user device interface and interconnecting a user device to one of the plurality of output interfaces.

13. The interconnecting system of claim 12 further including an address means positioned in the at least one remote connecting means; said address means providing a specific address to each of the plurality of output interfaces.

14. The interconnecting system of claim 13 further including a storage means interconnected to the dispatching means; said storage means including a plurality of storage locations, with each one dedicated to store characteristic information representative of a user device coupled to one of the plurality of output interfaces.

15. The interconnecting system of claim 14 wherein each one of the plurality of active remote attachment means includes an address register for storing the specific address assigned to an output interface when said each one of the plurality of active remote attachment means is plugged into said output interface; and means responsive to an identification command signal outputted from the line adapter means to cause the specific address stored in the address register to be transferred to one of the selected storage locations of said storage means.

16. A universal adapter for attaching a plurality of users devices through their standardized interfaces to at least one line adapter means of a communications controller having a transmit serial link and a receive serial link on which data and control information are carried in data and control slot entities with at least one entity for each user device which may be coupled to the at least one line adapter means and a plurality of entities forming frames which are transmitted on the transmit and receive links in period T, said interconnection system comprising:

a dispatching means coupled to the transmit and receive serial links and having pairs or input and output serial links; said dispatching means including: first transmitting means which receives the data and control slot entities from the transmit serial link and assemble distinct sets of data and control slot entities therefrom and concatenate an outband slot to each data and control entity and outputs each one of the sets of data control and outband slots on selected ones of the output serial links, in a frame period T;

first receiving means for generating the frames to be sent on the receive serial link from bits received on input serial line (34);

at least one remote connecting means (30) having a single connecting interface for coupling to one pair of the input and output serial links and a plurality of output interfaces;

with each output interface having a specific interface address to be assigned to a user device connected to said interface.

* * * * *